(12) United States Patent
Goodart et al.

(10) Patent No.: US 8,031,200 B2
(45) Date of Patent: Oct. 4, 2011

(54) VIDEO MATRIX DISPLAY INTERFACE

(75) Inventors: Joe Goodart, Austin, TX (US);
Shuguang Wu, Austin, TX (US); Bruce C. Montag, Austin, TX (US); Seen Yee Cindy Cheong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 722 days.

(21) Appl. No.: 12/125,334

(22) Filed: May 22, 2008

(65) Prior Publication Data

US 2009/0289946 A1 Nov. 26, 2009

(51) Int. Cl.
*G09G 5/00* (2006.01)
*G06F 13/14* (2006.01)
*G06F 15/80* (2006.01)

(52) U.S. Cl. .......... 345/520; 345/505; 345/1.1; 345/1.2; 345/1.3; 345/2.2

(58) Field of Classification Search .................... 345/1.1, 345/1.2, 1.3, 2.2, 3.1, 3.4, 541, 505, 520
See application file for complete search history.

(56) References Cited

U.S. PATENT DOCUMENTS

| 6,844,865 | B2 | 1/2005 | Stasko | |
|---|---|---|---|---|
| 2005/0219147 | A1* | 10/2005 | Sato | ............... 345/1.1 |
| 2008/0084359 | A1 | 4/2008 | Giannuzzi et al. | |

OTHER PUBLICATIONS

Sean P. O'Neal, Lawrence E. Knepper, and Reynold L. Liao; Graphics Processing System and Method, U.S. Appl. No. 11/695,816, filed Apr. 3, 2007.

Vesa—Video Electronics Standards Association; DisplayPort™ PHY Compliance Test Standard; VESA DisplayPort™ PHY Compliance Test Standard; Sep. 14, 2007; pp. 1-79; Version 1; Video Electronics Standards Association; Milpitas, CA.

Vesa—Video Electronics Standards Association; DisplayPort™ Link Layer Compliance Test Standard; VESA DisplayPort™ Link Layer Compliance Test Standard; Sep. 14, 2007; pp. 1-172; Version 1.0; Video Electronics Standards Association; Milpitas, CA.

Vesa—Video Electronics Standards Association; DisplayPort™ Standard; VESA DisplayPort Standard; Jan. 11, 2008; pp. 1-238; Version 1, Revision 1a; Video Electronics Standards Association; Milpitas, CA; http://www.vesa.org.

Vesa—Video Electronics Standards Association; DisplayPort Panel Connector; VESA DisplayPort Panel Connector Standard; Jan. 14, 2008; pp. 1-11; Version 1.1; Video Electronics Standards Association; Milpitas, CA.

Vesa—Video Electronics Standards Association; DisplayPort Interoperability Guideline; VESA DisplayPort Interoperability Guideline; Jan. 28, 2008; pp. 1-38; Version 1.1; Video Electronics Standards Association; Milpitas, CA.

* cited by examiner

*Primary Examiner* — Hau Nguyen
(74) *Attorney, Agent, or Firm* — Haynes and Boone, LLP

(57) ABSTRACT

In a video matrix display interface, an interface includes one or more subsystems to receive information from a plurality of display devices, compile the information from the plurality of display devices, report the compiled information to a graphics processing device, generate a video image using the compiled information, the image to be viewable across the plurality of display devices, splice the video image into portions and transmit the video image portions to the plurality of display devices, thereby creating a continuous image across the plurality of display devices.

20 Claims, 3 Drawing Sheets

VIDEO MATRIX DISPLAY INTERFACE

BACKGROUND

The present disclosure relates generally to information handling systems (IHSs), and more particularly to a video matrix display interface.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

It may be beneficial to have a multi-display device IHS to allow the user to view more information/applications, and/or a larger view of the information/applications. However, multi-display solutions are expensive and thus, not common.

Graphics processor units (GPUs) for an IHS may have two display controllers and associated display outputs (e.g., analog and/or digital) to support two display devices. However, to support more than two display devices for an IHS, there are previously two options, dedicated graphics adapters, and dedicated interfaces. For the first option, dedicated graphics processors with at least two graphics processor units provide up to four display outputs. This may be the only option for some applications where four independent display controllers are required. This option is expensive due to a dual-graphics processor unit approach and associated cost with power/thermal challenges. For the second option, dual graphics configurations where two graphics adapters are linked through a dedicated interface can be provided. This is a more scalable approach, but the system-level cost is very high because the platforms have to support two graphics adapters.

Accordingly, it would be desirable to provide an improved video matrix display interface absent the disadvantages discussed above.

SUMMARY

According to one embodiment, a video matrix display interface includes one or more subsystems to receive information from a plurality of display devices, compile the information from the plurality of display devices, report the compiled information to a graphics processing device, generate a video image using the compiled information, the image to be viewable across the plurality of display devices, splice the video image into portions and transmit the video image portions to the plurality of display devices, thereby creating a continuous image across the plurality of display devices.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
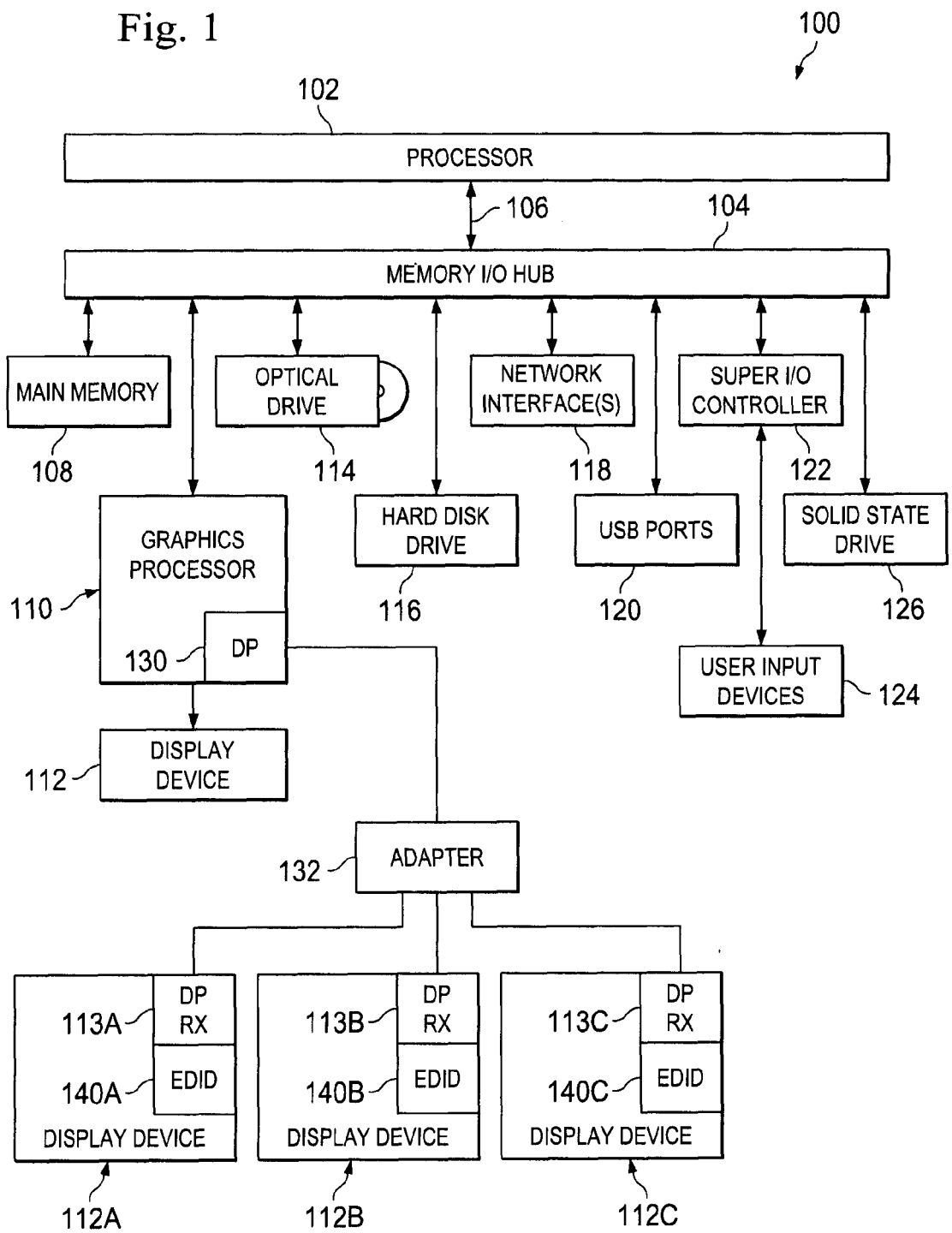
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

This disclosure provides a solution to couple 3 or more display devices 112A, 112B and 112C to display contiguous content for situations such as, gaming or panoramic viewing. An embodiment of the solution utilizes the signal bandwidth available using the Video Electronics Standards Association (VESA) DisplayPort™, digital display interface standard. The VESA DisplayPort™ standard, Version 1, Revision 1a, released Jan. 11, 2008 and related DisplayPort™ standards are herein incorporated by reference in their entirety.

In an embodiment, the present disclosure may link up three 22 inch wide display devices 112A, 112B and 112C, each having a viewing area of 1680×1050, to display a continuous image across a viewing area of approximately 5040×1050.

Also shown in FIG. 1 is a DisplayPort™ interface connection 130 coupled with the graphics processor 110. As commonly understood by one having ordinary skill in the art, an interface connection 130 is a source device and includes a transmitter (Tx) and couples to a sink device including a DisplayPort™ receiver (Rx) via a main link, and AUX CH and a hot plug detect (HPD) signal line (not shown). The main link is a uni-directional, high-bandwidth, and low latency channel used for transport of isochronous streams, such as uncompressed video and audio. AUX CH is a half-duplex, bidirectional channel used for link management and device control. The HPD signal serves as an interrupt request by a sink device.

The interface connection 130 couples to a matrix display interface adapter 132. The matrix display interface adapter 132 may be a separate module from the IHS 100 or may be part of the IHS 100. The matrix display interface adapter 132 is described below with respect to FIG. 4.

The adapter 132 may include one or more coupling lines coupling the adapter to one or more display devices 112A, 112B and 112C. In an embodiment, the adapter 132 couples to a DisplayPort™ receiver 113A, 113B and 113C. The display devices 112A, 112B and 112C may include an extended display identification data (EDID) interface 140A, 140B and 140C. EDID is a data structure provided by an display device 112, 112A, 112B and 112C to describe its capabilities to a graphics processor 110. For example, the EDID information may include manufacturer name, product type, timings supported by the display, display size, luminance data, pixel mapping data, and/or a variety of other features.

Figure 2:
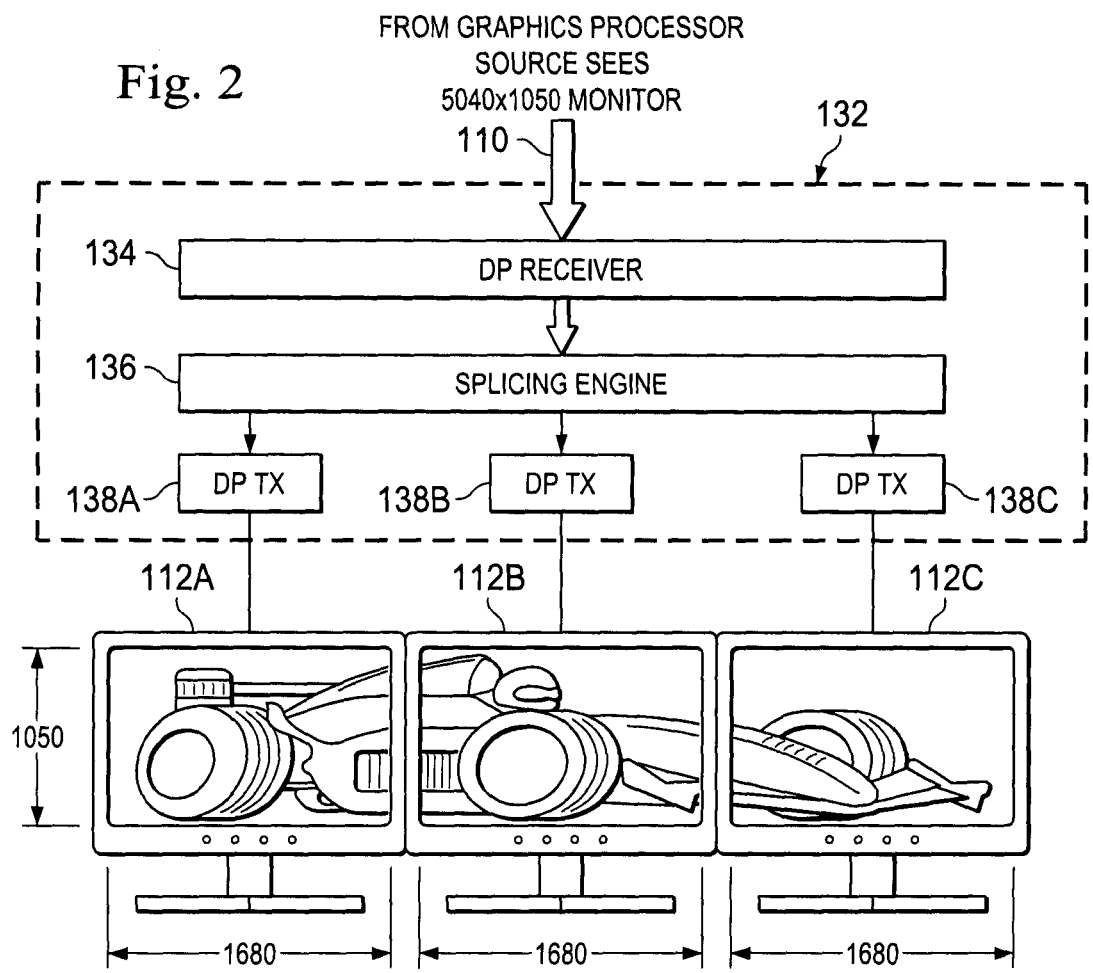
FIG. 2 illustrates a block diagram of an embodiment of a video matrix display device interface system.

FIG. 2 illustrates a block diagram of an embodiment of a video matrix display device interface system. In this embodiment, the interface connection 130 of the graphics processor 110 couples with the matrix display interface adapter 132 to receive single audio/video (A/V) signal via a single A/V cable set, splices the signal and communicates the spliced signal to the plurality of display devices 112A, 112B and 112C. The matrix display device interface adapter 132 may include one or more DisplayPort™ receiver(s) (Rx) 134, a splicing engine 136 and one or more DisplayPort™ transmitters 138A, 138B and 138C.

Figure 3:
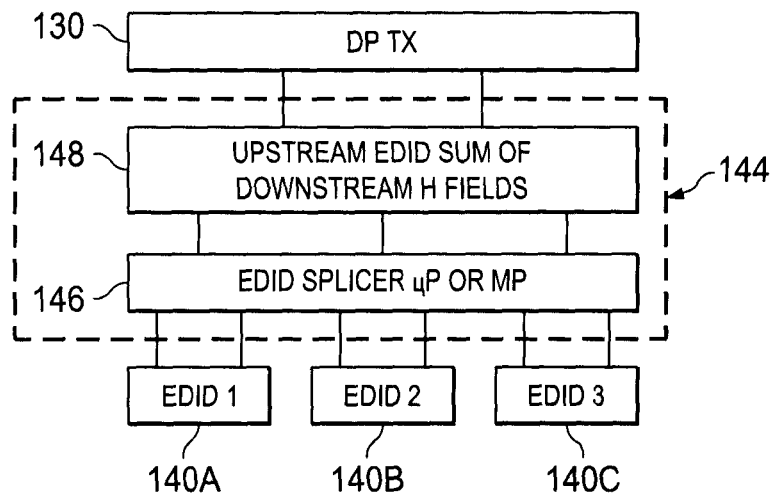
FIG. 3 illustrates a block diagram of an embodiment of a display device calculating system.

FIG. 3 illustrates a block diagram of an embodiment of a display device calculating system 144. The calculating system 144 receives the EDID information from the EDID interfaces 140A, 140B and 140C. The EDID information passes to an EDID splicer 146, up to an EDID summer 148, and then to the graphics processor 110 via the interface connection 130. In an embodiment, the EDID calculator 144 receives the EDID information from the connected display devices 112A, 112B and 112C, calculates new EDID information and transfers that new calculated EDID information to the IHS 100 so that the IHS 100 "thinks" that it is transmitting the A/V signals to a new larger display device 112. For example, if each of the display devices 112A, 112B and 112C have a display capability of 1680×1050, the new calculated EDID information would report to the IHS 100 that the display device is a display device having a capability of 5040×1050. Thus the A/V signal sent from the graphics processor 110 via the Tx is a signal for a 5040×1050 display device 112.

Figure 4:
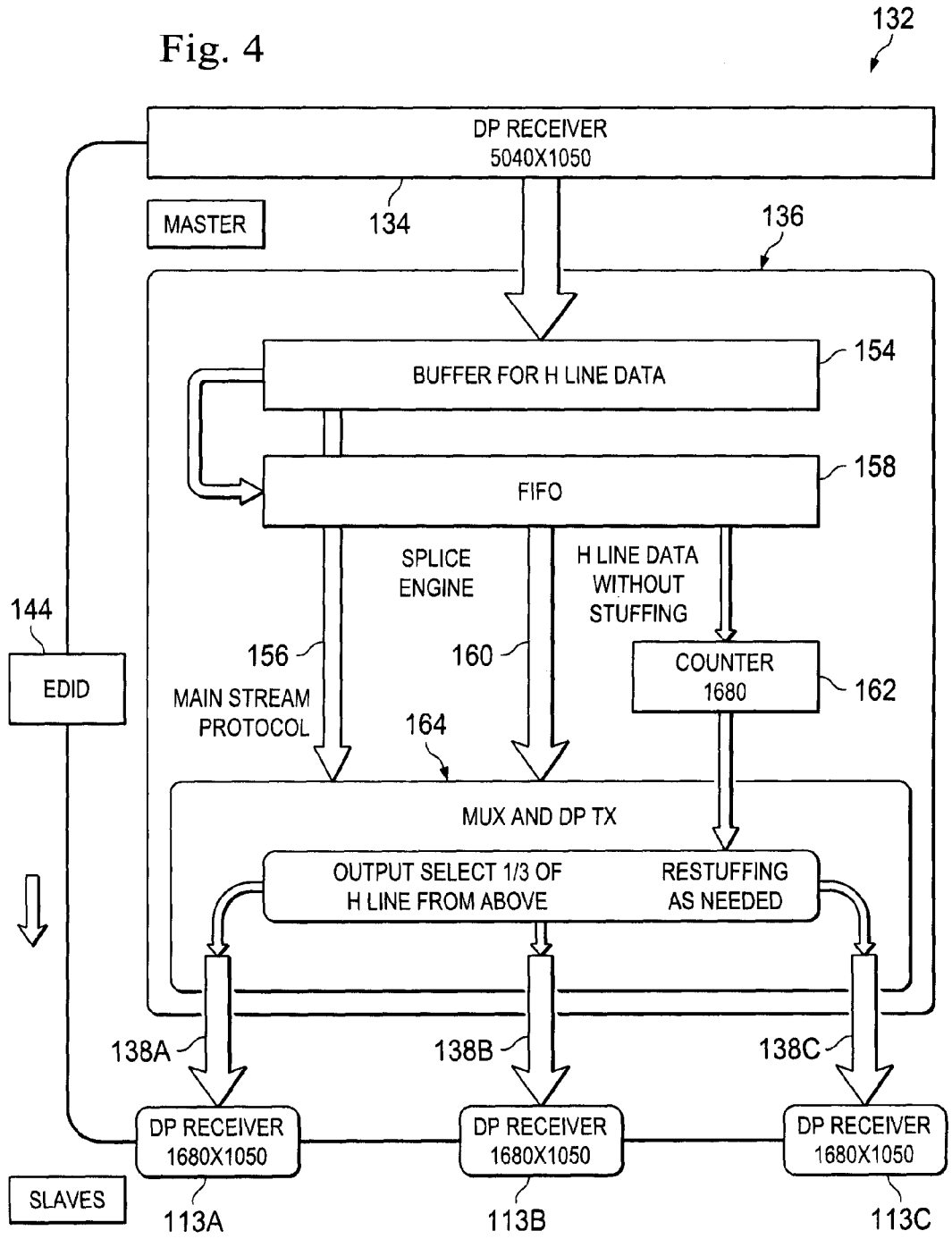
FIG. 4 illustrates a block diagram of an embodiment of a video matrix display device interface system.

FIG. 4 illustrates a block diagram of an embodiment of a video matrix display device interface system 132. In an embodiment, the EDID information is received from a plurality of slave receivers 113A, 113B and 113C, compiled to appear as a summation of the plurality of viewing sizes of the display devices 112A, 112B and 112C and communicated to the master receiver 134. The master receiver 134 may then communicate the compiled summed viewing size of the plurality of the display devices 112A, 112B and 112C to the graphics processor 110.

The splicing engine 136 receives A/V signals at the receiver (Rx) 134 from the graphics processor 110. The A/V signal is communicated from the Rx 134 to the splice engine 136. The H line data is received into a buffer 154. The buffer 154 conditions the signal and communicates the A/V signal to a first in first out (FIFO) register 158 and a multiplexer (MUX) and Tx 164. The signal is communicated from the buffer 154 to the MUX 164 via a main stream protocol communication link 156. The A/V signal is also communicated from the FIFO 158 to the MUX 164 and/or a counter 162. The communication from the FIFO 158 to the MUX 164 may be of H line data without stuffing at 160. Additionally, the counter 162 may communicate with the MUX 164 to communicate a timing signal to the MUX and Tx 164. The MUX 164 may output a portion of the H line signal via each of the transmitters 138A, 138B and 138C to each of the receivers 113A, 113B and 113C.

In an embodiment, the disclosure uses an adaptor kit 132 which has a receiver 134. The A/V signal packets received are parsed by a splicing engine 136 which then transmits the video content over 3 transmitters 138A, 138B and 138C to each display device 112A, 112B and 112C.

In an embodiment, a general implementation of this disclosure includes a programmable multi-display device solution with single DisplayPort™ controller, that can support dual (e.g., up to 1920×1200 each), triple (e.g., up to 1680×1050 each) or quad (e.g., up to 1440×900 each) display devices 112, 112A, 112B, 112C and 112D. When two DisplayPort™ controllers are incorporated, which is possible with next-generation graphics adapters, it has the potential to support quad 1920×1200 or eight 1440×900 through single graphics adapter. Combining with dual a graphics configuration, it could support eight 1920×1200 or sixteen 1440×900 for a cost effective video wall solution.

This disclosure includes an opportunity to lead in the multi-display solutions market, while maintaining a low cost of implementation. Additionally, this is achievable without signal compression and may provide an advantage over USB linked displays, which are becoming increasingly popular. The triple-display device solution is suitable for the high-end gaming space and for bundling with gaming platforms. Its can also be generalized to enable cost-effective video wall or digital signage solution (up to 16 screens).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-display adapter, comprising:
a display device calculating system that is operable to:
receive display identification information from a plurality of display devices;
compile the display identification information from the plurality of display devices, wherein the compiled display identification information includes a summation of the plurality of display devices; and
report the compiled display identification information to a graphics processing device; and
a splicing engine that is operable to:
receive a plurality of digital signal packets from the graphics processing device that each include digital audio signals and digital video signals, wherein the plurality of digital signals packets are provided for the summation of the plurality of display devices;
splice the digital video signals into portions of at least one horizontal line signal; and
output the portions of the at least one horizontal line signal through a plurality of transmitters to respective display devices in the plurality of display devices, thereby creating a continuous image across the plurality of display devices.

2. The adapter of claim 1, wherein the display device calculating system includes a summer that creates the summation of the plurality of display devices including a summation of at least one component of an aspect ratio of the plurality of display devices.

3. The adapter of claim 1, wherein the plurality of digital signal packets are operable to be received via a single cable.

4. The adapter of claim 1, wherein the plurality of digital signal packets are transmitted from the graphics processing device to the splicing engine through a DisplayPort interface.

5. The adapter of claim 1,
wherein the splicing engine further comprises:
a buffer that is operable to condition and communicate the digital video signals.

6. The adapter of claim 5, wherein the splicing engine further comprises:
a first-in first out register operable to receive and communicate the digital video signals communicated from the buffer.

7. The adapter of claim 6, wherein the splicing engine further comprises:
a multiplexer and transmitter that is operable to:
receive the digital video signals from the buffer and the first-in first-out register; splice the digital video signal into portions of the at least one horizontal line signal, and output the portions of the at least one horizontal line signal through a plurality of transmitters.

8. An information handling system (IHS) comprising:
a processor;
a graphics processing device coupled with the processor; and
a display device calculating system that is coupled to the graphics processing device and operable to:
receive display identification information from a plurality of display devices;
compile the display identification information from the plurality of display devices, wherein the compiled display identification information includes a summation of the plurality of display devices; and
report the compiled display identification information to the graphics processing device; and
a splicing engine that is coupled to the graphics processing device and operable to:
receive a plurality of digital signal packets from the graphics processing device that each include digital audio signals and digital video signals, wherein the plurality of digital signals packets are provided for the summation of the plurality of display devices;
splice the digital video signals into portions of at least one horizontal line signal; and
output the portions of the at least one horizontal line signal through a plurality of transmitters to respective display devices in the plurality of display devices, thereby creating a continuous image across the plurality of display devices.

9. The IHS of claim 8, wherein the display device calculating system includes a summer that creates the summation of the plurality of display devices including a summation of at least one component of an aspect ratio of the plurality of display devices.

10. The IHS of claim 8, wherein the plurality of digital signal packets are operable to be received via a single cable.

11. The IHS of claim 8, wherein the plurality of digital signal packets are transmitted from the graphics processor device and the splicing engine through a DisplayPort interface.

12. The IHS of claim 8,
wherein the splicing engine further comprises:
a buffer that is operable to condition and communicate the digital video signals.

13. The IHS of claim 12,
wherein the splicing engine further comprises:
a first-in first out register operable to receive and communicate the digital video signals communicated from the buffer.

14. The IHS of claim 13, wherein the splicing engine further comprises:
a multiplexer and transmitter that is operable to:
receive the digital video signals from the buffer and the first-in first-out register; splice the digital video signal into portions of the at least one horizontal line signal, and output the portions of the at least one horizontal line signal through a plurality of transmitters.

15. A method for displaying an image across a plurality of display devices, the method comprising:
receiving display identification information from a plurality of display devices;
compiling the display identification information from the plurality of display devices, wherein the compiled display identification information includes a summation of the plurality of display devices;
reporting the compiled display identification information to a graphics processing device;
receiving a plurality of digital signal packets from the graphics processing device that each include digital audio signals and digital video signals, wherein the plurality of digital signals packets are provided for the summation of the plurality of display devices;
splicing the digital video signals into portions of at least one horizontal line signal; and
outputting the portions of the at least one horizontal line signal through a plurality of transmitters to respective display devices in the plurality of display devices, thereby creating a continuous image across the plurality of display devices.

16. The method of claim 15, wherein the summation of the plurality of display devices including a summation of at least one component of an aspect ratio of the plurality of display devices.

17. The method of claim 15, wherein the plurality of digital signal packets are received via a single cable.

18. The method of claim 17, wherein the display identification information is received from the plurality of display devices through a DisplayPort interface.

19. The method of claim 15, wherein the plurality of digital signal packets are transmitted from the graphics processor device and the splicing engine through a DisplayPort interface.

20. A multi-display video system, comprising
a display device calculating system that is operable to:
  receive display identification information from a plurality of display devices through a first DisplayPort interface;
  compile the display identification information from the plurality of display devices, wherein the compiled display identification information includes a summation of the plurality of display devices; and
  report the compiled display identification information to a graphics processing device through a second DisplayPort interface; and
a splicing engine comprising:
  a receiver that is operable to receive a plurality of digital signal packets through the second DisplayPort from the graphics processing device that each include digital audio signals and digital video signals, wherein the plurality of digital signals packets are provided for the summation of the plurality of display devices;
  a multiplexer and transmitter that is coupled to the receiver and that is operable to:
    splice the digital video signals into portions of at least one horizontal line signal; and
    output the portions of the at least one horizontal line signal through a plurality of transmitters to respective display devices in the plurality of display devices, thereby creating a continuous image across the plurality of display device.

* * * * *